Oct. 27, 1970   L. H. BOWEN III, ETAL   3,536,943
ELECTRICALLY POWERED HAND TOOL
Original Filed Aug. 9, 1968   4 Sheets-Sheet 1

INVENTORS
LAWRENCE H. BOWEN, III
JERRY W. SELLERS

BY Strauch, Nolan, Neale,
Nies & Kurz
ATTORNEYS

Oct. 27, 1970

L. H. BOWEN III, ETAL 3,536,943

ELECTRICALLY POWERED HAND TOOL

Original Filed Aug. 9, 1968

INVENTORS

LAWRENCE H. BOWEN, III
JERRY W. SELLERS

BY *Strauch, Nolan, Neale,*
*Nies & Kurz*

ATTORNEYS

Oct. 27, 1970   L. H. BOWEN III, ETAL   3,536,943
ELECTRICALLY POWERED HAND TOOL
Original Filed Aug. 9, 1968   4 Sheets-Sheet 4

INVENTORS
LAWRENCE H. BOWEN, III
JERRY W. SELLERS
BY Strauch, Nolan, Neale,
Nies & Kurz
ATTORNEYS

United States Patent Office 3,536,943
Patented Oct. 27, 1970

3,536,943
ELECTRICALLY POWERED HAND TOOL
Lawrence H. Bowen III, Lancaster, Pa., and Jerry W. Sellers, Lexington, Tenn., assignors to Rockwell Manufacturing Company, Pittsburgh, Pa., a corporation of Pennsylvania
Continuation of application Ser. No. 751,438, Aug. 9, 1968. This application Oct. 31, 1969, Ser. No. 871,788
Int. Cl. H02k 7/14
U.S. Cl. 310—50           14 Claims

ABSTRACT OF THE DISCLOSURE

An electrically powered hand tool having a plastic, electrically non-conductive casing which is longitudinally divided into two complementary shells for housing an electric motor and a gear transmission drive connecting the motor armature shaft to the tool-driving output shaft. A pair of gear compartment defining bearing plates, preferably of pressed oil-soaked metal powder, supporting the output shaft, the inboard end of the motor armature shaft, and the intermediate gearing. Interlocking formations integrally formed on each shell and each bearing plate prevent the bearing plates from turning in the casing.

---

This application is a continuation of application Ser. No. 751,438, filed on Aug. 9, 1968, for Electrically Powered Hand Tool.

FIELD OF INVENTION

This invention relates to power tools and is particularly concerned with portable electrically powered hand tools such as, for example, hand drills.

BACKGROUND

Conventional hand drills and similar tools commonly comprise a hollow casing, an electric motor mounted in the casing, and a gear train drive connecting the motor armature shaft to the tool-driving output shaft. In some of the more popular prior tools, the casing is made of plastic and the shaft support bearings are mounted directly on internal surfaces of the casing. This type of construction has resulted in complications in that the heat transmitted through the bearings by operation of the tool softens the plastic casing sufficiently to allow the inherent gear separating forces to separate intermeshing gears just enough to cause stripping.

Various solutions have been proposed to avoid these objectionable conditions, but they generally are impractical because they so increase the cost of the tool as to offset the savings realized by utilizing the relatively inexpensive, molded plastic casings. For example, some prior tools have relatively rigid internal sheaths or skeleton-like structures mounting the operative parts in assembled relation independently of the casing. In such a construction, the casing is carried by the skeleton structure and functions merely as a cover.

SUMMARY AND OBJECTS OF THE INVENTION AND DESCRIPTION OF DRAWINGS

In overcoming the foregoing problems, the power hand tool of this invention is provided with a dual bearing plate assembly having bores directly journalling the inboard end of the motor armature shaft, the tool-driving output shaft, and, if desired, an idler gear shaft which supports gearing that provides for a multiple gear reduction in the drive ratio of the transmission. The bearing plates dissipate the bearing heat over such a sufficiently large area that the temperature at the peripheries of the bearing plates is reduced enough to avoid softening of the usual plastics employed in the manufacture of the casing. As a result, the bearing plates may be supported directly on interior surfaces of the plastic casing and may be locked against turning by interlocking, complementally nested formations respectively formed integral with the casing and the bearing plates.

Accordingly, the major object of this invention is to provide a novel power tool shaft support structure.

Another object of this invention is to provide a novel power tool which is inexpensive and easy to assemble and disassemble.

In fulfilling the last mentioned object, only two parts, namely the two bearing plates constructed according to this invention are required for mounting the output shaft, the idler gear shaft, and the inboard end of the motor armature shaft. Consequently, the number of parts required is significantly reduced as compared with those prior tools which have an assortment of shaft-support bushings, bushing supporting brackets, fastening elements, and, in some cases, an internal skeleton-like support structure which carries the outer casing and which supports the interior tool parts.

The bearing plates of this invention are furthermore separately engaged with the plastic casing and are mounted in the casing without the use of fastener elements such as screws and the like. As a result, not only the bearing plates but the entire assembly of interior tool parts may be easily and quickly assembled and disassembled.

Further objects of this invention will appear as the description proceeds in connection with the appended claims and the annexed drawings wherein:

FIG. 5 is a section taken substantially along lines 5—5 of FIG. 1;

FIGS. 10 and 10A are sections taken respectively along lines 10—10 and 10A—10A of FIG. 2 and showing both of the casing shells in cross section.

DETAILED DESCRIPTION

Figure 1:
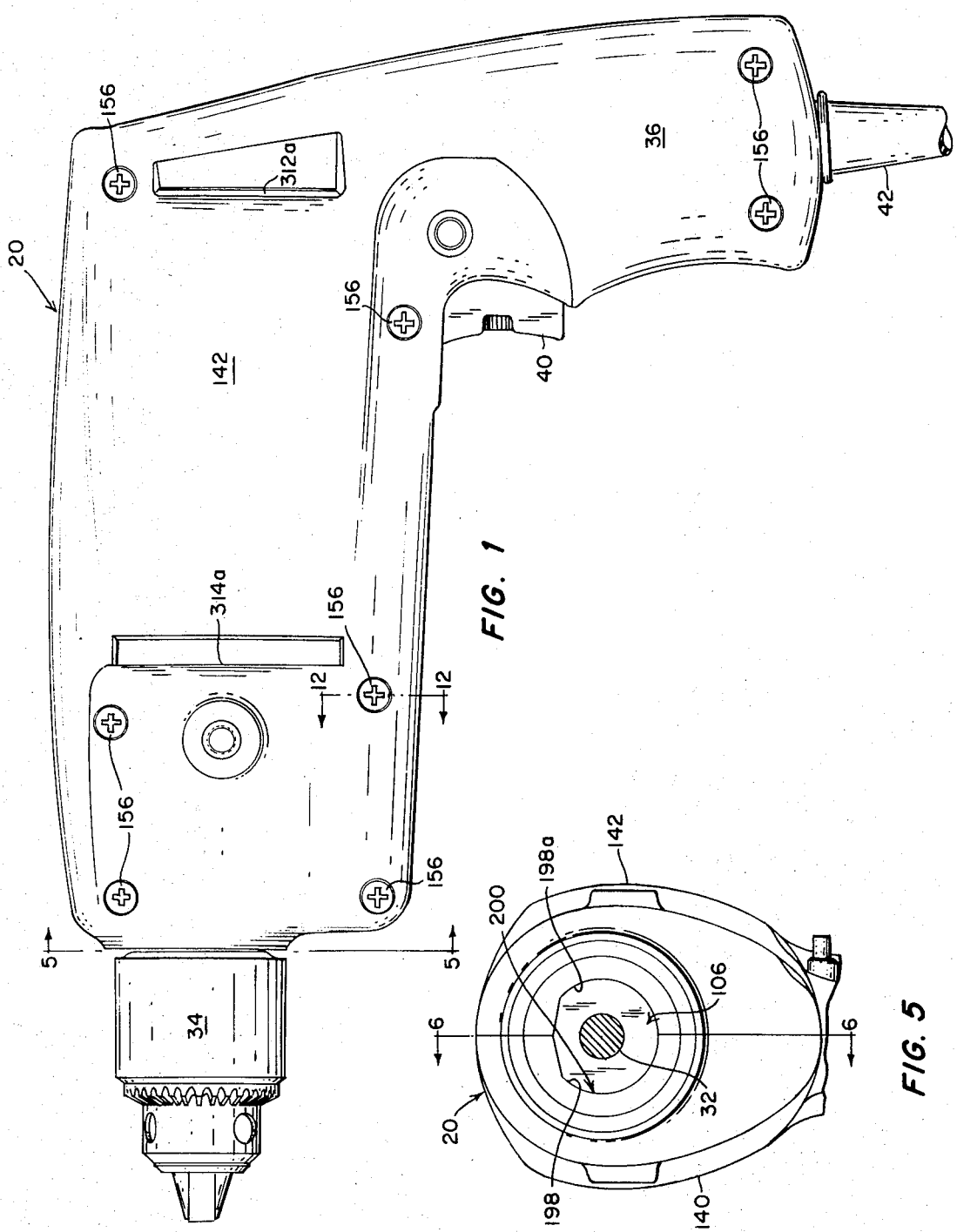
FIG. 1 is a side elevation of an electrically powered hand drill constructed according to a preferred embodiment of this invention and having a casing which is longitudinally divided into a pair of complementary shells.
Figure 2:
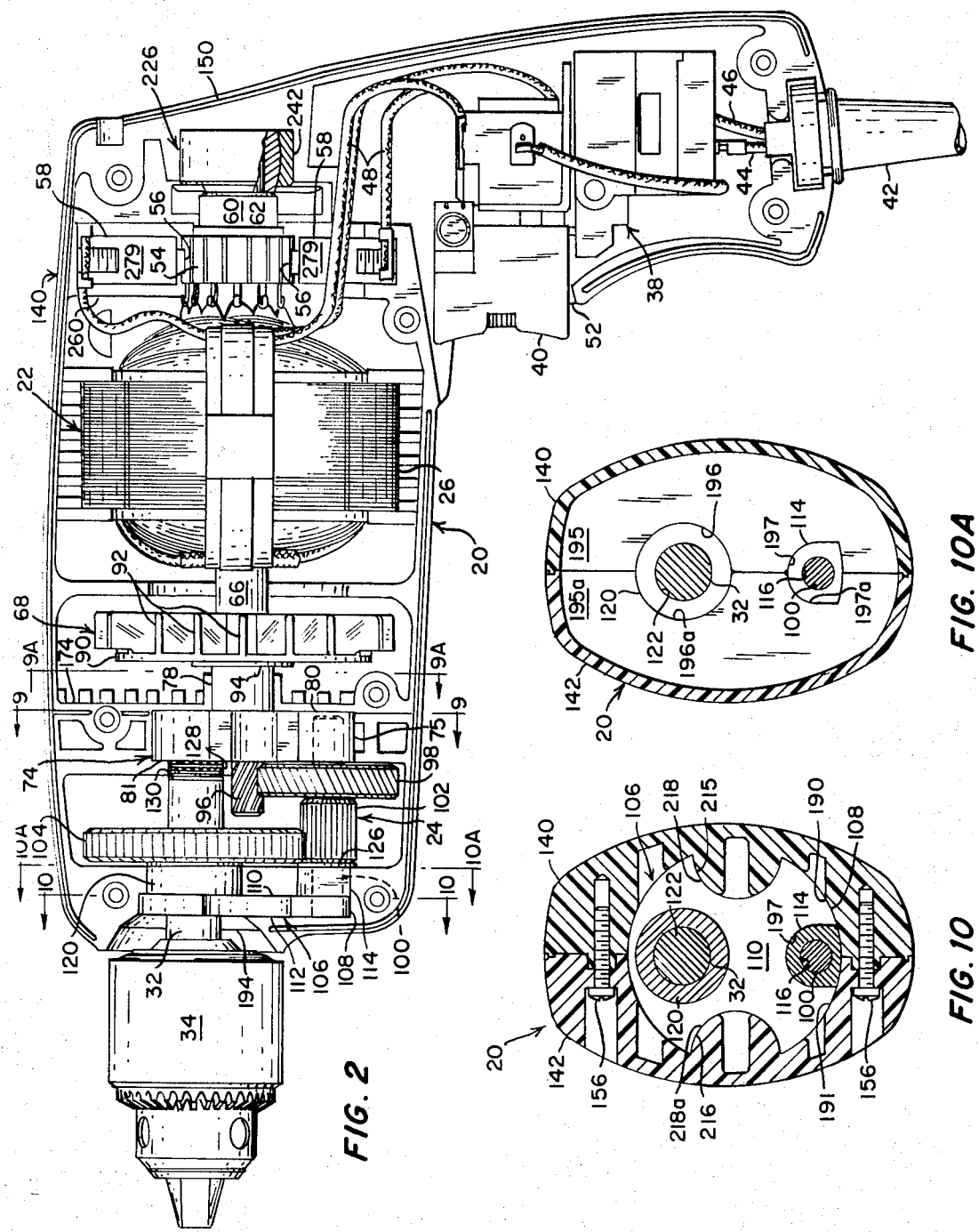
FIG. 2 is a similar side elevation but with one of the casing shells removed to illustrate the internal parts of the drill.

Referring now to the drawings and more particularly to FIGS. 1 and 2, the electrically powered hand drill incorporating the principles of this invention is shown to comprise a hollow casing 20 in which an electric motor 22 and a tool-driving gear train 24 are mounted. Motor 22 is of conventional construction and, as best shown in FIG. 2, comprises a stator 26 having field windings peripherally surrounding an armature 28. Armature 28 is mounted on an armature shaft 30 which is drive connected by gear train 24 to an output shaft or spindle 32. Shaft 32 extends beyond the forward end of casing 20 and mounts a tool attaching member such as a chuck 34. An unshown drill bit or other tool is adapted to be mounted in chuck 34.

Casing 20 has a hollow, pistol grip-type handle 36 which houses a switch assembly 38 having a manually manipulatable trigger 40 for controlling operation of motor 22.

Power is supplied to operate motor 22 through a conventional power cord 42 which extends into the butt end of handle 36. Cord 42 has a pair of insulated electrical conductors 44 and 46 which are respectively connected to an input terminal of switch assembly 38 and to a terminal end of stator 26 in the usual manner. The conductors electrically connecting switch assembly 38 to motor 22 are generally indicated at 48.

Switch assembly 38 is conventional and preferably is of the type that is operable to selectively reverse the rotation of armature shaft 30 and to control the motor speed. The electrical connections between switch assembly 38 and motor 22 define an electrical circuit of any suitable, conventional form.

Trigger 40 is operably positioned in a slot 52 (see FIG. 2) and is adapted to actuate switch assembly 38 to control the energization of motor 22. Trigger 40 is preferably an insulated member formed from a suitable, electrically nonconductive plastic or other suitable material.

As best shown in FIG. 2, a commutator 54 forming a part of motor 22 is carried by shaft 30 adjacent to the outboard end thereof and is electrically connected to armature 28 in the usual manner. Brush elements 56, which are spring biased into electrical contact with commutator 54 are mounted in electrically non-conductive brush holders 58 which preferably are rectangular in cross section. Commutator 54 and brush elements 56 are conventional and are connected to the other parts of motor 22 and to switch assembly 38 in a conventional manner. Armature 28 and commutator 54 are preferably insulated from shaft 30 by any suitable, unshown means.

Figure 7:
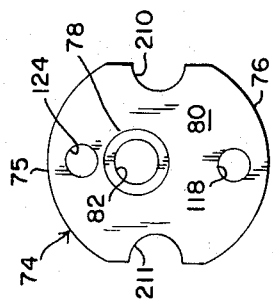
FIG. 7 is an elevation of the back side of the armature shaft supporting bearing plate facing the electric motor compartment in the casing.

According to this invention, a metallic bearing plate 74 rotatably supports the inboard, tool-driving end of shaft 30 and is preferably pressed into shape from a suitable, oil-soaked metal powder. Bearing plate 74, as best shown in FIGS. 2 and 7, has a body section 75 which is of generally circular configuration and which is formed with a uniformly diametered cylindrical peripheral surface indicated at 76 in FIG. 7 and with flat, parallel, oppositely facing side surfaces indicated at 80 and 81 in FIG. 6. A boss or collar portion 78 forming an integral part of bearing plate 74 projects perpendicularly from surface 80 which faces motor 22. A uniformly diametered, cylindrically smooth walled bore 82 is formed through body section 75 and coaxially through boss portion 78. Armature shaft 30 rotatably and coaxially extends through bore 82 and is journalled directly on the lubricated, cylindrical bore surface.

Figure 6:
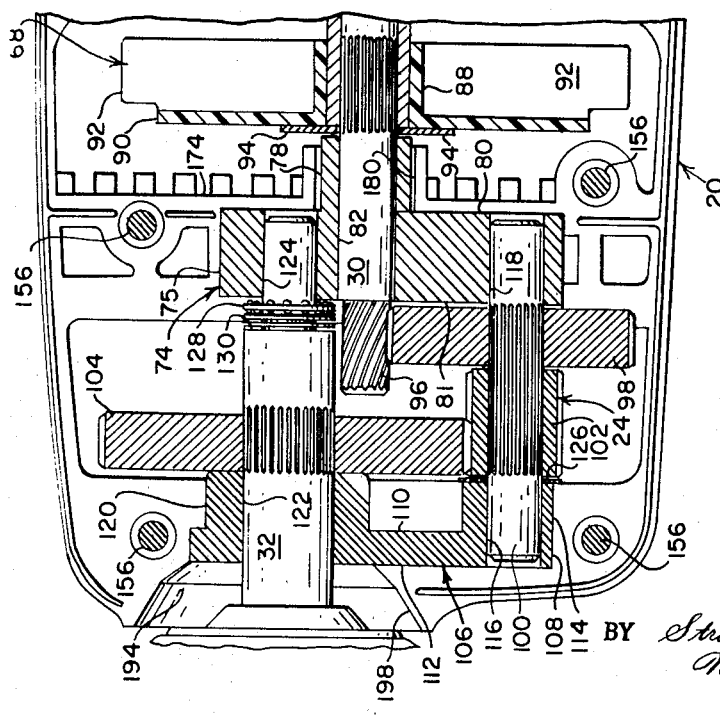
FIG. 6 is a fragmentary longitudinal section taken substantially along lines 6—6 of FIG. 5.

As best shown in FIGS. 2 and 6, a fan 68 is non-rotatably fixed on armature shaft 30 between boss portion 78 and sleeve 66 and has a hub 88 through which the armature shaft coaxially extends with a press fit. Formed integral with hub 88 is a generally flat-sided, annular vane support plate section 90 having a substantially uniformly diametered outer peripheral edge and extending perpendicularly with respect to the longitudinal axis of hub 88. Equiangularly spaced apart flat-sided vanes 92 are formed integral with an extend radially from hub 88. Vanes 92 are integrally joined to and project axially from the flat surface of plate section 90 which faces motor 22. Preferably fan 68 is formed as an integral structure from a suitable, electrically non-conductive plastic material. A flat-sided thrust washer 94 carried by armature shaft 30 is disposed between the flat end face of boss portion 78 and the opposing flat surface of plate section 90.

As best shown in FIG. 2, the forward or inboard tool-driving end of armature shaft 30 extends beyond bearing plate 74. A spiral gear 96 integrally formed on this end of shaft 30 constantly meshes with a larger diametered gear 98 which is nonrotatably mounted on a shaft 100. A gear 102, which is of smaller diameter than gear 98 but of larger diameter than gear 96, is non-rotatably mounted on shaft 100 axially adjacent to gear 98. Gear 102 constantly meshes with a gear 104 which is non-rotatably fixed on output shaft 32. Gear 104 is of considerably larger diameter than gear 98 as shown. Gears 98, 102, and 104 define gear train 24 and provide the usual speed reduction for driving output shaft 32.

As shown in FIGS. 2 and 6, shaft 100 is supported by bearing plate 74 and a further bearing plate 106. Bearing plate 106 is similar in configuration as compared to plate 74 and, as best shown in FIGS. 2 and 8, comprises a body section 108 having a uniformly diametered cylindrical surface and flat, parallel oppositely facing surfaces indicated at 110 and 112 respectively.

Like bearing plate 74, plate 106 is preferably pressed into shape from a suitable, oil-soaked metal powder and is integrally formed with a boss or collar portion 114 projecting perpendicularly from surface 110. A uniformly diametered, cylindrically smooth walled bore 116 is formed through body section 108 and coaxially through boss portion 114 and coaxially receives the forward end of shaft 100. Shaft 100 is journalled directly on the lubricated cylindrical wall surface of bore 116 as best shown in FIG. 6.

The opposite end of shaft 100 is coaxially and rotatably received in a cylindrically smooth walled, uniformly diametered bore 118 which is formed through body section 75 of bearing plate 74. Bearing plates 74 and 106 are angularly oriented relative to each other in such a manner to be described in detail later on that bores 116 and 118 are substantially axially aligned relative to each other. The end of shaft 100 supported by bearing plate 74 is journalled directly on the lubricated cylindrical wall surface of bore 118 as shown in FIG. 6.

Figure 8:
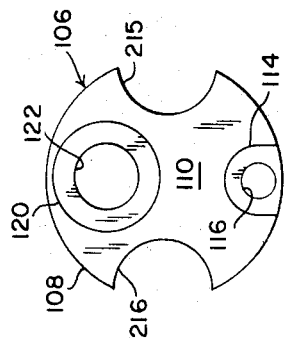
FIG. 8 is an elevation of the back side of the output shaft supporting bearing plate facing the gear train compartment in the casing.

To support output shaft 32, bearing plate 106, as best shown in FIGS. 2 and 8, is integrally formed with a further boss portion 120 extending perpendicularly from surface 110. Shaft 32 as shown in FIG. 6, coaxially and rotatably extends through a uniformly diametered, cylindrically smooth walled bore 122 which is formed through body section 108 and coaxially through boss portion 120. Shaft 32 is provided with a reduced diametered, rearward end which is coaxially and rotatably received in a further uniformly diametered, cylindrically smooth walled bore 124. Bore 124 is formed through body section 75 of bearing plate 74. Shaft 32 is journalled directly on the lubricated cylindrical wall surfaces of bores 122 and 124. The angular orientation of bearing plates 74 and 106 is such that bores 122 and 124 substantially axially align with respect to each other.

As best shown in FIG. 7, bores 82, 118, and 124 are spaced from each other and are formed along parallel longitudinal axes which are eccentric to the center of body section 75. Similarly, bores 116 and 122 are spaced apart from each other and are formed along parallel longitudinal axes which are eccentric to the center of body section 108.

Gears 98 and 102 are fixed against axial displacement on shaft 100, and shaft 100 is confined against axial displacement relative to bearing plates 74 and 106 by abutment of gear 98 with bearing plate surface 81 and abutment of gear 102 with a washer 126 which is carried by shaft 100 and which seats against the flat end face of boss portion 114. Gear 104 is fixed against axial displacement on shaft 32, and shaft 32 is confined against axial displacement relative to bearing plates 74 and 106 by abutment of gear 104 with the flat end face of boss portion 120 and by one or more washers 128 which are carried by the reduced diametered end of shaft 32 and which are axially confined between the bearing plate surface 81 and the annular shaft shoulder indicated at 130.

Figure 3:
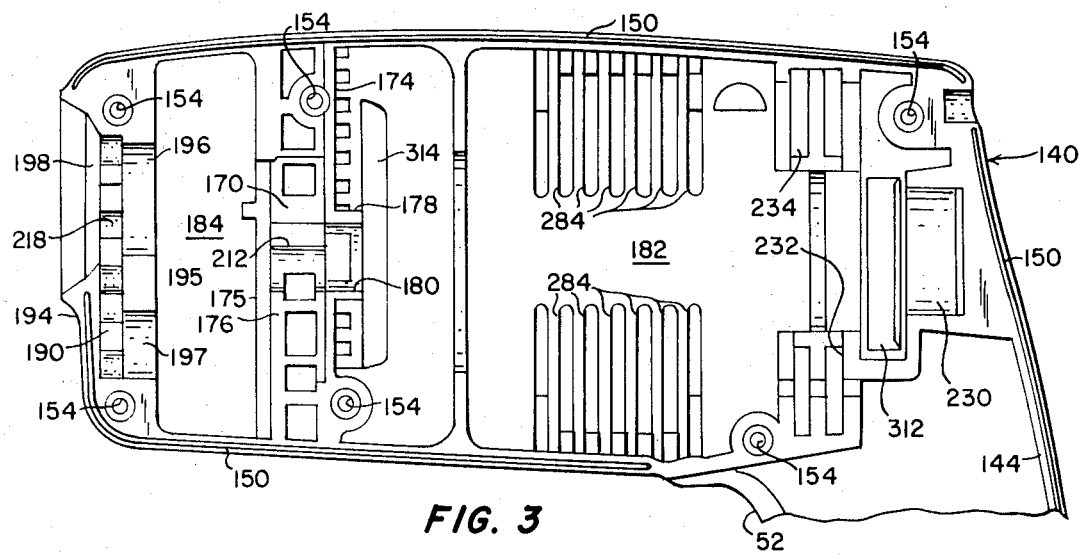
FIG. 3 is a fragmentary interior side elevation of the tool casing shell shown in FIG. 2.
Figure 4:
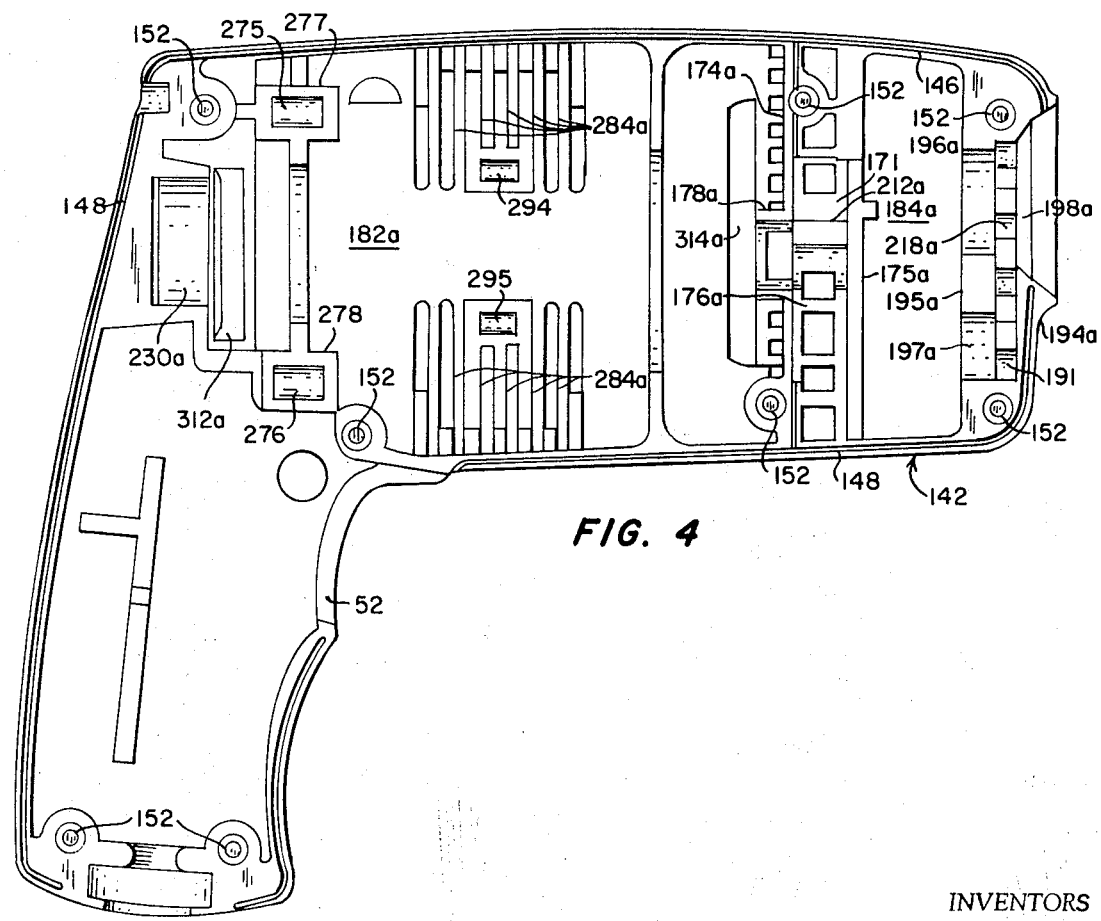
FIG. 4 is an interior side elevation of the other tool casing shell.

Referring now to FIGS. 3 and 4, casing 20 is longitudinally divided into two complementary lightweight shells 140 and 142 to provide a clam shell type enclosure for the interior parts of the hand drill. Shells 140 and 142 are separately molded from a suitable, electrically non-conductive plastic and have oppositely dished curvatures to define the interior mechanism-receiving cavities which will be described in detail later on.

Shells 140 and 142 are respectively formed with mating longitudinal edge surfaces 144 and 146 which seat against each other along an interface which is contained in a common plane passing through the rotational axis of armature shaft 30. A shallow, longitudinal groove 148 is formed in surface 146 and is generally continuous except at slot 52, the nose or forward end of casing 20, and the butt of handle 36. A complemental, longitudinal lip 150 integrally formed on shell 140 and projecting from surface 144 is coextensive with and interfittingly seats in groove 148 to insure proper alignment of shells 140 and 142 in assembled relation.

A series of spaced apart, parallel through bores 152 are formed in shell 142 perpendicularly of the longitudinal casing axis and axially align with blind tapped bores 154 which are formed in shell 140. Machine screws 156 (see FIG. 1) extending through bores 152 are threaded into bores 154 to firmly secure shells 140 and 142 together.

As shown in FIGS. 3 and 4, shells 140 and 142 are respectively formed with a pair of complementary, internal cavities 170 and 171 which mate to form a cylindrical enclosure for interfittingly receiving bearing plate 74. Plate 74 extends perpendicularly of the armature shaft axis. The axis of shaft 30 in this embodiment is generally coaxial with the body portion of casing 20 receiving motor 22 and gear train 24.

Cavity 170, as shown in FIG. 3, is defined by a generally semi-circular partition section 174, a rib 175 and a cylindrical wall surface 176 (see FIG. 9) extending between partition section 174 and rib 175. Partition section 174 delimits the rearward end of cavity 170 and is formed with a semi-circular boss portion 178 which projects from the rearwardly facing wall surface of partition section 174. Rib 175 delimits the forward end of cavity 170 and is essentially parallel with partition section 174.

Shell 142 has an interior wall construction which forms cavity 171 and which is the same as that just described for cavity 170. Accordingly like reference numerals suffixed by the letter *a* have been applied to designate like formations.

Boss portions 178 and 178*a* are complementary to form opposite halves of a bore 180 (FIG. 9A) which coaxially receives the bearing plate boss portion 78. Partition sections 174 and 174*a*, as best shown in FIG. 9A, have mating, generally straight edges which seat against each other in a plane containing the longitudinal casing axis and the shell interface extending along edge surfaces 144 and 146. Sections 174 and 174*a* are complementary to form a continuous internal partition (see FIG. 9A) which extends perpendicularly with respect to the longitudinal casing axis and which divides the interior of casing 20 into a motor compartment and a gear compartment. The motor compartment, as shown in FIGS. 3 and 4, is formed by opposed complementary cavities 182 and 182*a* in shells 140 and 142 respectively. The gear compartment is similarly formed by opposed, complementary cavities 184 and 184*a* in shells 140 and 142 respectively.

Figure 9:
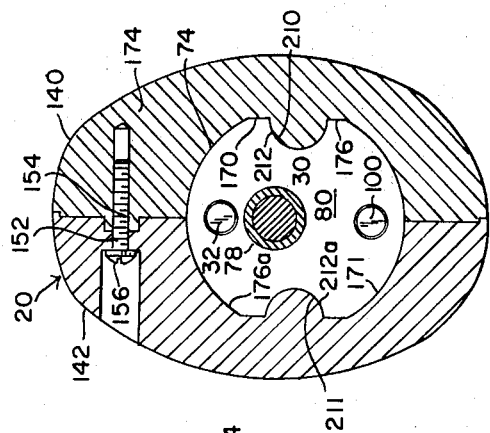
FIGS. 9 and 9A are sections taken respectively along lines 9—9 and 9A—9A of FIG. 2 and showing both of the casing shells in cross section.
Figure 9A:
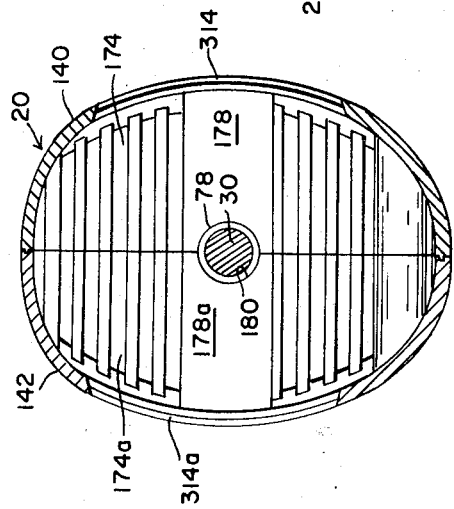

Cavities 170 and 171, as best shown in FIG. 9, receive diametrically opposite halves of body section 75, and the oppositely facing surfaces of body section 75 interfittingly seat against the opposed surfaces of partition section 174 and rib 175 and the opposed surfaces of partition section 174*a* and rib 175*a*.

At the nose or forward end of casing 20, shells 140 and 142, as shown in FIGS. 3 and 4, are respectively formed with complementary, arcuate recesses 190 and 191 for receiving body section 108 of bearing plate 106. Shell 140 has an exterior front wall or nose portion 194 and a thick, internal rib 195 which respectively delimit the front and back of recess 190. Rib 195 is formed with a pair of notches 196 and 197 each having a generally semi-circular cylindrical wall surface. Notch 196 interfits with the periphery of boss portion 120, and notch 197 interfits with boss portion 114. Wall portion 194, as best shown in FIG. 5, has an enlarged, semi-circular notch 198 which axially aligns with notch 196 to provide an opening for output shaft 32.

The formations of shell 142 defining recess 191 are the same as that just described for the shell formations defining recess 190. Accordingly, like refernce numerals suffixed by the letter *a* have been applied to designate like formations as shown in FIG. 4.

Notches 196 and 196*a*, as best shown in FIG. 10A, are complementary to define a cylindrically smooth walled bore which coaxially and snugly receives boss portion 120. Similarly notches 197 and 197*a* are complementary to define a bore which coaxially and snugly receives boss portion 114.

Cavities 190 and 191, as best shown in FIG. 10, receive diametrically opposite halves of the bearing plate body section 108, and the opposite faces of body section 108 snugly seat against the opposed internal surfaces of rib 195 and wall portion 194 and the opposed internal surfaces of rib 195*a* and wall portion 194*a*.

As best shown in FIG. 5, the edge surfaces of notches 198 and 198*a* form an aperture 200 when shells 140 and 142 are assembled. The diameter of aperture 200 is considerably larger than the diameter of shaft 32 so that shaft 32 freely extends through aperture 200 in spaced relation to the edge surfaces of notches 198 and 198*a*. Body section 108 internally covers aperture 200 to enclose the gear compartment defined by cavities 184 and 184*a*. Surface 112 of body section 108 is exteriorly exposed through aperture 200 and cooperates with shells 140 and 142 to define an envelope enclosing the interior of casing 20. With this construction it is not necessary to carefully dimension aperture 200 for enclosing the interior parts of the tool. Heat generated by operation of the tool also is dissipated through the exteriorly exposed portion of bearing plate 106. Bearing plate 106, by virtue of the construction just described, distributes the loads applied thereto over a greater area of the casing as compared with cylindrical or bushing type bearings.

From the foregoing description it will be appreciated that bearing plates 74 and 106 cooperate with the formations of shells 140 and 142 to completely and tightly enclose gear train 24 in the gear compartment formed cavities 184 and 184*a*. This compartment, therefore, may be filled with a mass of grease or other suitable plastic lubricant for the gear train. Owing to the construction just described, escape of the lubricant into the motor compartment or to the exterior of the tool is prevented.

According to this invention, a pair of radially outwardly opening notches or grooves 210 and 211 are, as best shown in FIGS. 7 and 9, formed in the periphery of the bearing plate body section 75 and matingly receive internal protuberances 212 (FIGS. 3 and 9) and 212*a* (FIGS. 4 and 9) to orient plate 74 relative to the other parts of the tool. Notches 210 and 211 are each formed longitudinally through body section 75 and with cylindrically smooth, substantially uniformly diametered wall surfaces. As shown in FIG. 7, notches 210 and 211 are essentially on diametrically opposite sides of body section 75, and the longitudinal axes of notches 210 and 211 are parallel with each other and with bores 82, 118, and 124.

Protuberances 212 and 212*a* are integrally formed on shells 140 and 142 respectively and respectively project radially inwardly toward each other from wall surfaces 176 and 176*a* as best shown in FIG. 9. Protuberance 212, as best shown in FIG. 3, is integrally joined at opposite ends to partition section 174 and rib 175. Similarly, protuberance 212*a* is integrally joined at opposite ends to partition section 174*a* and rib 175*a* as shown in FIG. 4.

Protuberances 212 and 212*a* are each of generally semi-cylindrical configuration having smooth, essentially uniformly diametered peripheries protruding from surfaces 176 and 176a. As shown in FIG. 9, protuberances 212 and 212a interfittingly seat in notches 210 and 211 respectively to thus interlock with plate 74 and to thus prevent plate 74 from turning within casing 20.

A pair of radially outwardly opening notches or grooves 215 and 216 (see FIGS. 8 and 10) are also formed in the periphery of the bearing plate body section 108 and matingly receive internal protuberances 218 (FIG. 3) and 218a (FIG. 4) respectively. Notches 215 and 216 are each formed longitudinally through body section 108 and with cylindrically smooth, substantially uniformly diametered wall surfaces. As best shown in FIG. 8, notches 215 and 216 are essentially on diametrically opposite sides of body section 108, and the longitudinal axes of notches 215 and 216 are parallel with each other and with bores 116 and 122.

Protuberances 218 and 218a are integrally formed on shells 140 and 142 respectively and extend generally radially toward each other and into recesses 190 and 191 from the peripheral, internal wall surfaces defining the recesses as best shown in FIG. 10. Protuberance 218, as shown in FIG. 3, is integrally joined at opposite ends to nose portion 194 and rib 195, and protuberance 218a, as shown in FIG. 4, is integrally joined at opposite ends to nose portion 194a and rib 195a.

Protuberances 218 and 218a are both of generally semi-cylindrical configuration, having smooth, essentially uniformly diametered peripheries protruding inwardly from the internal peripheral wall surfaces of recesses 190 and 191. As shown in FIG. 10, protuberances 218 and 218a interfittingly seat in notches 215 and 216 respectively to thus interlock with plate 106 and to thus prevent bearing plate 106 from turning within casing 20.

Each of the protuberances 212, 212a, 218, and 218a and its associated one of the bearing plate notches 210, 211, 215, and 216 form interlocking formations to angularly orient bearing plates 74 and 106 such that in assembled relation plates 74 and 106 are securely locked in positions where bores 116 and 122 are maintained in close, axial alignment with bores 118 and 124 respectively even though a casing 20 may have been somewhat distorted as a result of mounting the internal tool parts in place and clamping shells 140 and 142 together. The axes of shafts 32 and 100 are therefore maintained closely parallel with each other and with bore 82. Because plates 74 and 106 are interlocked in their proper oriented positions and are secured against relative angular displacement, misalignment of the shaft-journalling, bore surfaces and improper meshing of gears are minimized. As a result, the gear train components are relatively free from binding.

It will also be noted that by virtue of mounting the inboard end of armature shaft 30 and the adjacent end of shaft 100 in plate 74, the inherent gear separating forces resulting from meshing gear 96 with gear 98 cannot force shafts 30 and 100 apart. As a consequence, gear stripping is avoided even though casing 20 may become distorted or deformed. Likewise, gears 104 and 126 cannot be separated sufficiently to cause stripping by virtue of supporting corresponding ends of shafts 100 and 32 in plate 106.

The area of the exterior, heat-dissipating surfaces of each of the bearing plates 74 and 106 is made sufficiently large that the bearing heat transmitted to casing 20 is not enough to soften the casing in the regions where it supports and locks with each bearing plate. As a result, casing 20 will not be weakened to allow forces imparted to plates 74 and 106 by transmitting rotational motion to shaft 32 to turn plates 74 and 106 relative to each other. In view of the foregoing, it is clear that with the bearing plate construction of this invention no internal sleeve or skeleton-like structure is required for supporting the interior parts of the tool independently of the outer casing.

It is also clear that bearing plates 74 and 106 are the only two parts mounting gear 24 in the casing. More specifically, only two parts, namely plates 74 and 106, are required to journal and support shafts 32 and 100 and the inboard end of shaft 30. No bushings, fasteners, brackets or other support structure is required. Plates 74 and 106 are each separate in their respective casing cavities and are not fixed to the casing by any screws or the like. As will become apparent, neither stator 26 nor the outboard armature shaft bearing is fixed to the casing by fastening elements such as screws. As a result, the interior parts of the tool are easily and quickly assembled in and removable from the casing. In addition, the fewer parts needed to mount the gear train in the casing and to journal the associated shafts reduced manufacturing costs as compared with prior power hand tools.

As shown in FIG. 2, bearing 62 preferably comprises an oil-soaked powdered metal knuckle which rotatably receives the outboard end of shaft 30 and which is seated for limited universal rocking motion in a socket 226. Socket 226 is interfittingly seated in complemental cavities 230 (FIG. 3) and 230a (FIG. 4) respectively formed in shells 140 and 142.

As best shown in FIG. 3, shell 140 is formed with a pair of cavities 232 and 234 which slidably and interfittingly receive brush holders 58. To confine brush holders 58 against lateral displacement transversely of the armature shaft axis, a pair of small resilient pads 275 and 276 are respectively fixed on the inner ends of projections 277 and 278 (see FIG. 4) which are integral with shell 142. Pads 275 and 276 may be formed from any suitable material such as rubber and are compressed against the flat, brush holder side surfaces indicated at 279 in FIG. 2 to thus securely confine brush holders 58 in cavities 232 and 234 when shells 140 and 142 are secured together.

As shown in FIGS. 3 and 4, shells 140 and 142 are respectively formed with multiple rib formations 284 and 284a which cradle and support stator 26 in casing 20. A pair of resilient pads 294 and 295 are fixed in sockets formed in shell 142 and are compressed against stator 26 to thus frictionally grip and confine the stator against displacement.

When motor 22 is energized, fan 68 is rotated to draw air into casing 20 through apertures 312 and 312a which are respectively formed in shells 140 and 142 just forwardly of cavities 230 and 230a. This air is drawn in wiping contact over motor 22 to cool it and is propelled by vanes 92 radially outwardly and discharged through outlet apertures 314 and 314a. Apertures 314 and 314a are respectively formed in shells 140 and 142 adjacent to partition sections 174 and 174a.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description.

What is claimed and desired to be secured by Letters Patent is:

1. In an electrically powered hand tool having an external plastic casing longitudinally divided into a pair of separately formed complementary shells, an electrical motor enclosed by said casing, an armature shaft forming a part of said motor and having an inboard tool-driving end, a second shaft, intermeshing gears respectively disposed on said inboard end and said second shaft for drive connecting said armature shaft to said second shaft motion transmitting means adapted to drive connect said second shaft to a workpiece-engaging tool means for driving said tool means, and means mounting said shafts in said casing, the improvement comprising at least one bearing plate forming a part of said shaft mounting means and having a pair of parallel bores respectively receiving the inboard end of said armature shaft and said second shaft, said plate being confined against displacement in said casing only by separable seating engagement against interior surfaces of said shells, and two spaced apart pairs of complementally nested, interlocking formations respectively disposed on opposite sides of a longitudinal plane containing the interface between said shells for preventing said plate from turning when said shafts are rotated, one formation of each of said pairs being formed on said plate, and the other formations of said two pairs being respectively formed on said shells.

2. The electrically powered hand tool defined in claim 1 wherein the formations of each of said pairs respectively comprise a notch and a protuberance seated in said notch.

3. The electrically powered hand tool defined in claim 2 wherein the notch of each of said pairs is formed in the periphery of said plate, and wherein the protuberances of said two pairs respectively formed one on each of said shells.

4. The electrically powered hand tool defined in claim 1 wherein said two pairs of formations are diametrically opposed relative to a center point on said plate.

5. The electrically powered hand tool defined in claim 1 wherein said bearing plate is formed from lubricant-soaked powdered metal, and wherein said armature shaft and said second shaft are journalled directly on the interior wall surfaces of their associated bores in said plate.

6. In an electrically powered hand tool having an external plastic casing, an electric motor enclosed by said casing, an armature shaft forming a part of said motor and having an inboard, tool-driving end, an idler shaft, a tool-driving output shaft, and gear means on said armature shaft, said idler shaft and said output shaft for drive connecting said inboard end to said output shaft, the improvement comprising a pair of spaced apart bearing plates each having at least a pair of bores receiving at least two of said shafts, and interlocking complementally nested formations respectively formed integral with said casing and each bearing plate for preventing said plates from turning within said casing.

7. The electrically powered hand tool defined in claim 6 comprising means formed integral with said casing and cooperating with said bearing plates to confine a mass of lubricant in an enclosure receiving said gear means.

8. The electrically powered hand tool defined in claim 7, wherein one of said bores in one of said plates axially aligns with one of said bores in the other of said plates, wherein opposite ends of said idler shaft is received in said aligned ones of said bores, wherein the other of said bores in said one of said plates rotatably receives the inboard end of said armature shaft, and wherein the other of said bores in said other plate rotatably receives said output shaft.

9. The electrically powered hand tool defined in claim 8, wherein said casing is longitudinally divided into a pair of complementary shells having complemental surface means defining an aperture in the nose of said casing, said output shaft extending freely through said aperture in spaced relation to said complemental surface means, and said other plate interiorly covering said aperture and having a heat dissipating surface exteriorly exposed through said aperture.

10. The electrically powered hand tool defined in claim 6, there being two pairs of said formations for each of said plates with one formation of each pair being a notch and the other formation of each pair being a protuberance seated in the notch of its associated pair.

11. The electrically powered hand tool defined in claim 10, wherein said casing is longitudinally divided into a pair of complementary shells, wherein the two protuberances of the two pairs associated with each plate are integral one with each of said shells, and wherein the notches of said pairs are peripherally formed in said plates.

12. The electrically powered hand tool defined in claim 11 wherein said shafts are seated directly on the interior surfaces of the associated ones of said bores in said plates, and wherein said plates are confined against displacement in said casing only by separable seating engagement with interior surfaces of said casing.

13. In an electrically powered hand tool having an external plastic casing capable of being softened by excessive heat, an electric motor enclosed by said casing, an armature shaft forming a part of said motor and having an inboard, tool-driving end, a tool-driving output shaft, and gear means comprising at least a pair of intermeshing gears drive connecting said inboard end of said shaft to said output shaft, the improvement comprising at least one metallic, heat dissipating bearing plate having a bore receiving and directly journalling one of said shafts, coacting interengaging surface means formed interiorly on said casing and exteriorly on said plate and providing the sole means for confining said plate against displacement within said casing, said surface means including interlocking formations respectively formed integral with said plate and said casing for preventing said plate from turning with said one shaft, the area of the exterior, heat dissipating surface of said plate being large enough that insufficient heat is imparted to said surface means of said casing to soften it to an extent where said plate becomes displaceable under the influence of forces imparted thereto by transmitting rotational motion to said output shaft.

14. In an electrically powered hand tool having an external plastic casing longitudinally divided into a pair of separately formed complementary shells, an electric motor enclosed within said casing, an armature shaft forming a part of said motor and having an inboard, tool-driving end, a second shaft, means adapted to drive connect said second shaft to a tool holder, and means mounting said shafts in said casing, the improvement comprising at least one bearing plate forming a part of said shaft mounting means and having a pair of parallel bores respectively receiving the inboard end of said armature shaft and said second shaft, said plate being confined against displacement in said casing only by separable seating engagement against interior surfaces of said shells and having a body portion in which at least one of said bores is formed and separable, complementally nested, interlocking formations formed integral with said plate and said casing for preventing said plate from turning when said shafts are rotated, said formations being a recess and a protuberance interfittingly seated in said recess, said protuberance and said recess being disposed generally radially of said body portion.

References Cited
UNITED STATES PATENTS

| | | | |
|---|---|---|---|
| 2,809,311 | 10/1957 | Kohlhagen | 310—90 |
| 2,959,696 | 11/1960 | Tupper et al. | 310—90 |
| 2,965,774 | 12/1960 | Rangus | 310—50 |
| 3,121,813 | 2/1964 | Pratt et al. | 310—50 |
| 3,241,397 | 3/1966 | Wilkinson | 310—83 X |
| 3,413,498 | 11/1968 | Bowen et al. | 310—50 X |

DONOVAN F. DUGGAN, Primary Examiner

U.S. Cl. X.R.

310—44, 83, 89, 90